United States Patent [19]

Schlosser et al.

[11] Patent Number: 5,572,983
[45] Date of Patent: Nov. 12, 1996

[54] LEG ENHANCEMENTS FOR BARBECUE GRILL

[75] Inventors: Erich J. Schlosser, Barrington; Ewald Sieg, Palatine, both of Ill.

[73] Assignee: Weber-Stephen Products Co., Palatine, Ill.

[21] Appl. No.: 435,341

[22] Filed: May 5, 1995

[51] Int. Cl.⁶ .................................................. F24B 3/00
[52] U.S. Cl. ................ 126/25 R; 126/9 R; 403/230; 403/260
[58] Field of Search ................... 126/25 R, 9 R; 403/260, 230, 263

[56] References Cited

U.S. PATENT DOCUMENTS

| | | | |
|---|---|---|---|
| 1,460,928 | 7/1923 | Tilden | 403/260 |
| 3,111,337 | 11/1963 | Kates | 403/260 |
| 5,036,832 | 8/1991 | Schlosser et al. | 126/25 R |
| 5,080,313 | 1/1992 | Byrum et al. | 403/260 |

*Primary Examiner*—Carroll B. Dority
*Attorney, Agent, or Firm*—Wallenstein & Wagner, Ltd.

[57] ABSTRACT

The present invention relates to leg enhancements for barbecue grills (10) and specifically to a leg mounting element (100) for interconnecting each leg (6) to the cooking chamber (8) and a support assembly (200) for interconnecting the legs (6) to one another (6).

6 Claims, 5 Drawing Sheets

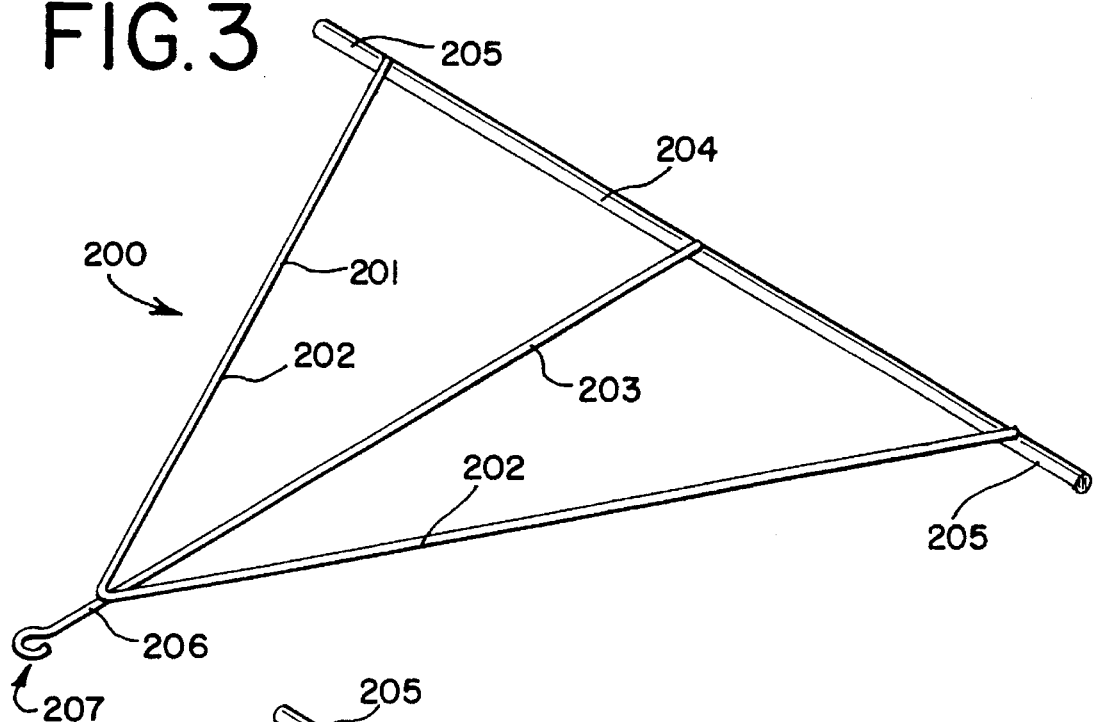
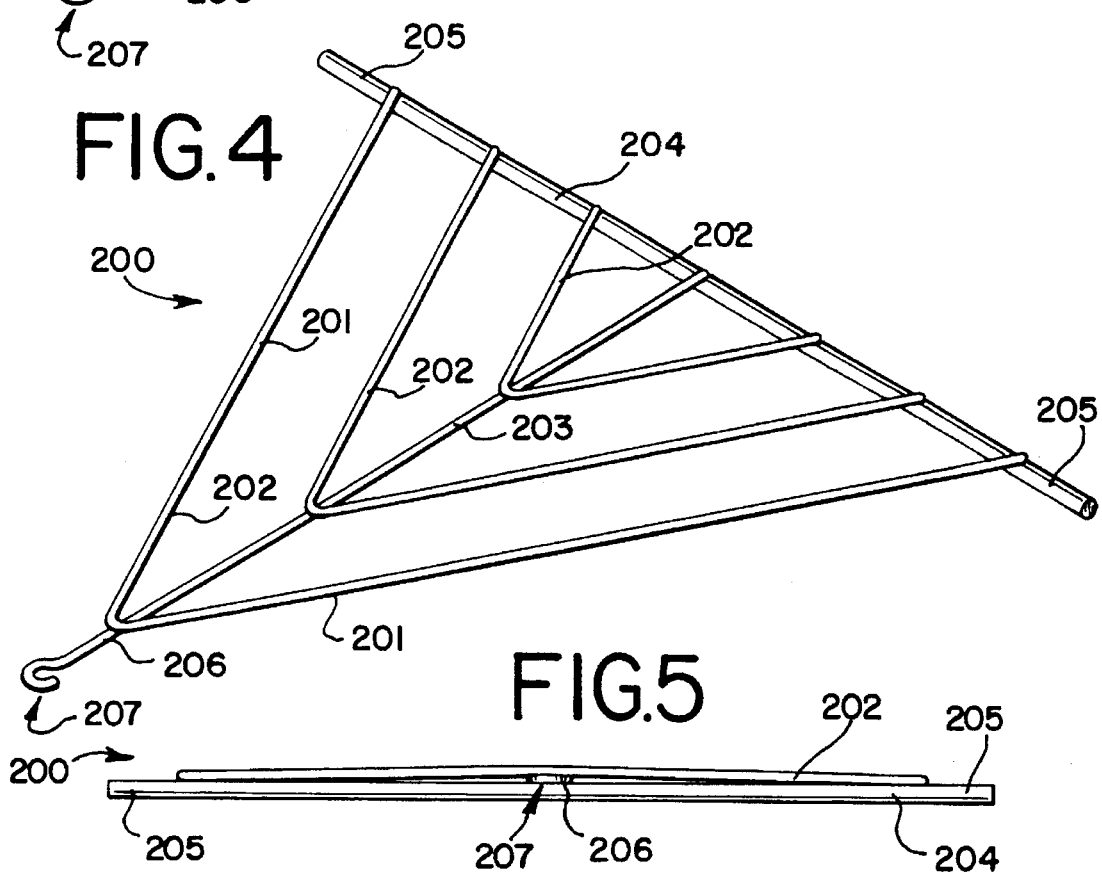
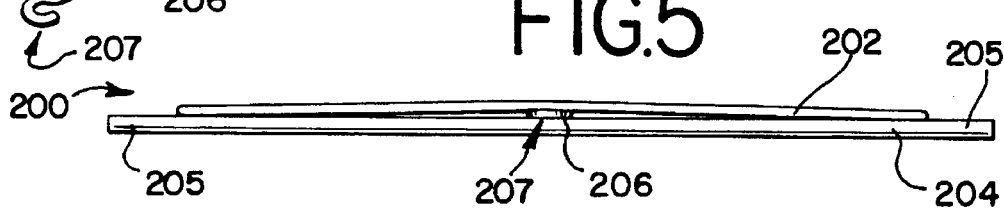
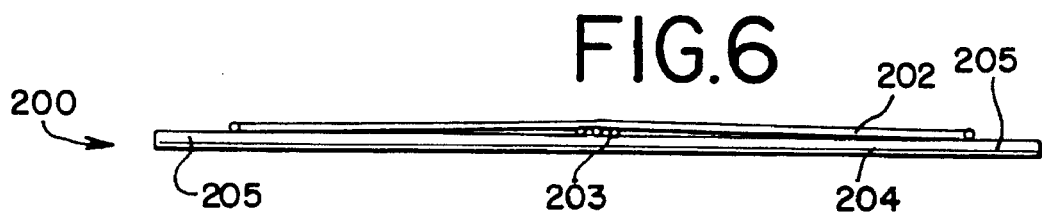

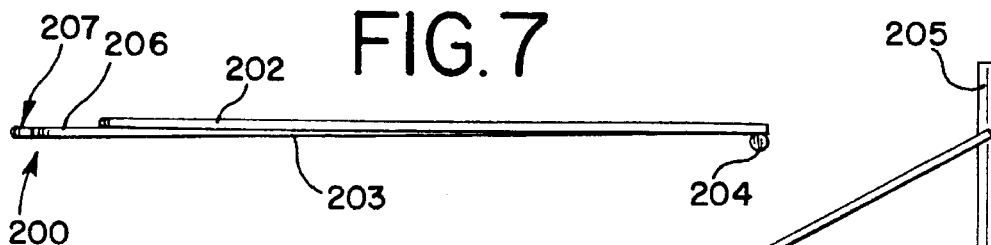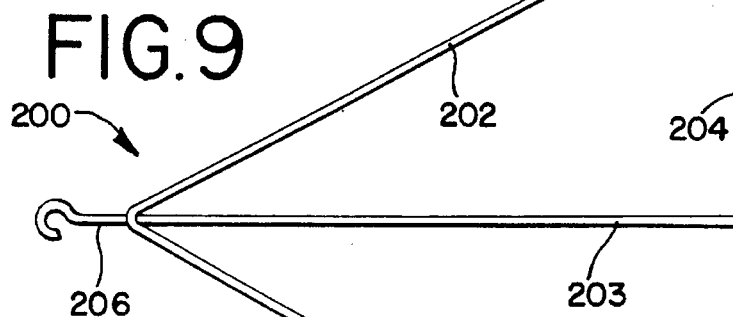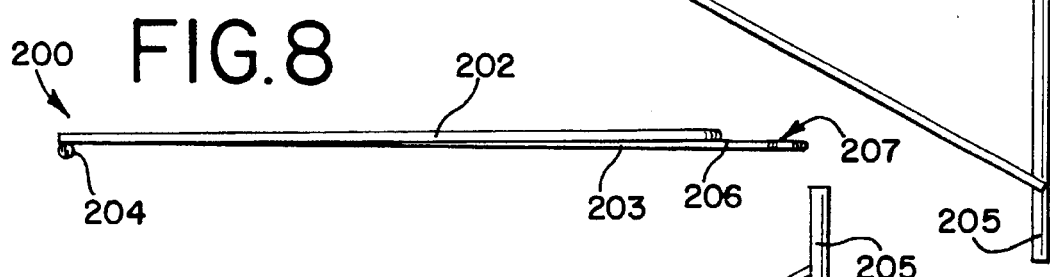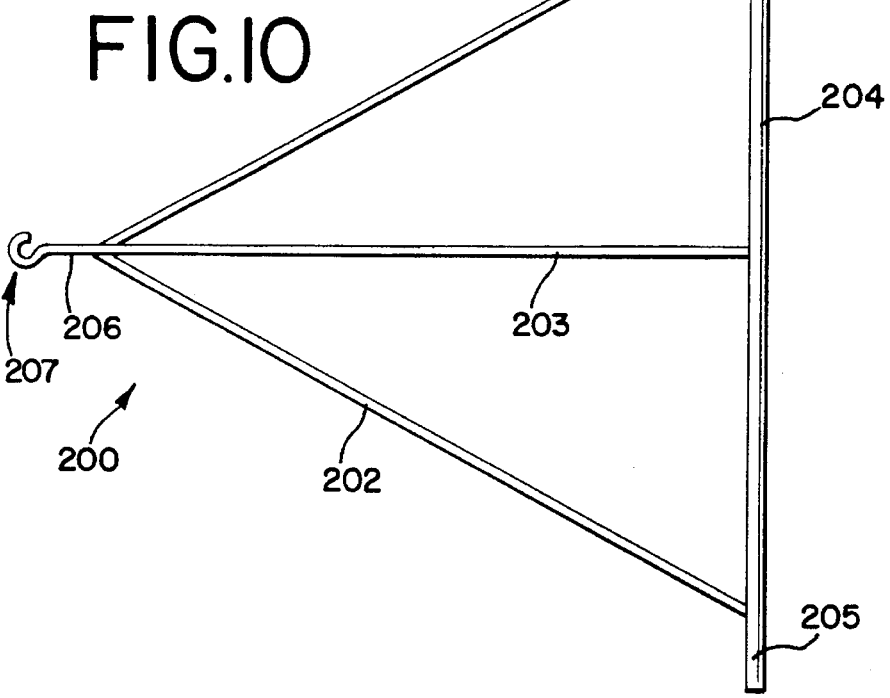

5,572,983

LEG ENHANCEMENTS FOR BARBECUE GRILL

TECHNICAL FIELD

The present invention relates generally to leg enhancements for barbecue grills, and more particularly, to the connections associated with the supporting legs of the grill. Specifically, a leg mounting element for interconnecting each leg to the grill and a support assembly for interconnecting the legs are described herein.

BACKGROUND PRIOR ART

Barbecue grills are very widely used today. Presently, one of the most popular grills, a kettle-type grill, is being marketed by the Assignee of the present invention, Weber-Stephen Products Co. This barbecue grill consists of a generally semi-spherical bottom bowl having a circular open top with a cooking grid slightly below the upper rim of the bowl. A fuel support grid for charcoal is positioned below the cooking grid. A generally semi-ellipsoid top cover can be placed on the bottom bowl. The barbecue grill is generally constructed in accordance with the teachings of U.S. Pat. No. Re. 33,091, also owned by the Assignee of the present invention. The grill can be supported by a tripod leg arrangement of the type disclosed in U.S. Pat. No. 3,538,906. The kettle configuration with and without the legs are registered trademarks of the Assignee of the present invention. The kettle can also be supported on various carts, such as those disclosed in U.S. Pat. Nos. 5,027,788 and 5,076,252, also owned by Weber-Stephen Products Co.

Typically, grills are sold in disassembled form. As a result, the consumer or owner assembles the grill. Consequently, continuous efforts are made to simplify the assembly of the final product. For example, the grills described above can be made with only a few basic tools. In some instances, no tools are required. In addition, continuous efforts are made to both strengthen the final assembly and to increase safety of the final assembly.

For structural strength and economy, metal tubing has proven eminently suitable as legs for outdoor barbecue equipment. Yet, on the one hand, permanent factory mounting of these legs can be impractical since this adds considerable bulk to the unit, e.g., added size for packaging and shipping. On the other hand, attachment of the tubular legs to the bottom of the cooking chamber can result in damage to the cooking chamber and any porcelain finish on the grill. One approach that addresses this is the use of sleeves with bayonet sockets permanently attached to the bottom of the cooking chamber for receiving and cooperating with each of the supporting legs. The present invention is an alternative to such a design. Specifically, the sleeves are eliminated and the legs are attached directly to the bottom of the bowl without risk of damage to the bowl or its finished surface. In addition, the enhancements of the present invention interconnect the legs together both easily and with minimal effort.

SUMMARY OF THE INVENTION

The present invention is used in conjunction with a barbecue grill assembly having a bottom cooking chamber or bottom bowl that is supported and maintained above the ground at a workable height by a plurality of supporting legs. The legs are generally tubular, that being hollow and round, rectangular, or triangular in cross-section with an exterior surface and an interior surface. According to a first aspect of the present invention, a mounting element is positioned at an upper end of each leg. This mounting element cooperates with the bottom cooking chamber or bottom bowl to interconnect the bottom bowl to the leg. In addition, a support member interconnects the legs and is attached adjacent the lower ends of the legs. This support member is further adapted to engage the internal surface, as opposed to the external surface, of at least one leg. In making this engagement, additional fasteners, e.g., screws, bolts, nuts, etc., are not necessary.

According to a further aspect of the present invention, the mounting element includes an insert secured to the upper end of the leg. This insert has a first fastener element, such as an externally threaded bolt or an internally threaded nut, attached thereto. The bowl has a second, cooperating fastener element, such as an internally threaded nut or an externally threaded bolt, attached thereto. In particular, the leg is tubular and the insert is a flat, disc shaped washer inserted into the upper end of the leg and held therein. The insert/washer has an opening with internal threading and the cooking chamber has an aperture therein. This insert/washer also has radial grooves or radial notches projecting inwardly from the outer edge. The notches or grooves are radially spaced apart and assist in preventing the insert/washer from rotating while it is in the leg.

A threaded fastener, such as a bolt with a head can thus be easily passed through the aperture in the chamber, with the head remaining inside the chamber, and mated with the internal threads formed in the washer by merely spinning or rotating the leg. Additionally, the end of the leg holding the washer is folded or rolled inwardly forming a flange over a portion of the washer. In short, this rolled portion forms a seat for the washer insert. A second flange or annular indentation is also formed in the leg under the washer. As a result, the washer is held between the first flange, formed by the folded portion, and the second flange formed by the indentation. By rolling, or folding, the end of the leg inwardly, the outermost portion of this rolled portion, and consequently, the leg, is smooth. Thus, when this end of the leg is fastened to the cooking chamber, it will not scratch, dent or mar the exterior of the cooking chamber upon contact.

According to a still further aspect of the present invention, The support member, which can double as a lower rack for cooking equipment and fuel, includes a wire, or rod, extending therefrom. This wire or rod is formed into a hook that has a cross-sectional diameter (the diameter of the wire or rod), a hook diameter (the diameter formed by the arc forming the hook), and a distal end. An opening is provided in at least one of the legs. This opening has a diameter greater than the cross-sectional diameter of the wire/rod and less than the hook diameter. This permits the distal end of the hook to be inserted into the opening and fed therethrough. By manipulating the leg with the opening, the hook is fed into the interior of the hollow leg. At a point, the wire hook can no longer be fed. The leg is thus securely attached. By linearly pulling the leg, the hook, now inside the leg, acts as a stop. Specifically, the distal end of or arcuate portion forming the hook, which is not collinear with the opening in the leg, contacts the inner surface of the leg. The upper portion of the leg can then be attached to the bottom bowl of the grill. To successfully remove the hook and support member from the leg, one must manipulate the leg and slowly remove the hook. Thus, once the upper end of the leg is secured to cooking chamber and the legs interlocked by the support structure, it is difficult to separate the legs from each other and the cooking chamber.

Other features and advantages of the invention will be apparent from the following specification taken in conjunction with the following drawings.

BRIEF DESCRIPTION OF THE DRAWINGS

In order that the present invention may be more fully understood, it will now be described by way of example, with reference to the accompanying drawings in which:

FIG. 3 is a perspective top view of the support assembly of FIG. 1;

FIG. 4 is a perspective top view of a second embodiment of the support assembly of FIG. 1;

FIG. 5 is a front elevation view of the support assembly of FIGS. 1, 3 and 4;

FIG. 6 is a rear elevation view of the support assembly of FIGS. 1, 3, 4 and 5;

FIG. 7 is a first side elevation view of the support assemblies of FIGS. 1–6;

FIG. 8 is a second side elevation view of the support assemblies of FIGS. 1–7;

FIG. 9 is a top plan view of the support assembly of FIGS. 1–3 and 5–8;

FIG. 10 is a bottom plan view of the support assembly of FIGS. 1–3 and 5–9;

DETAILED DESCRIPTION

Figure 1:
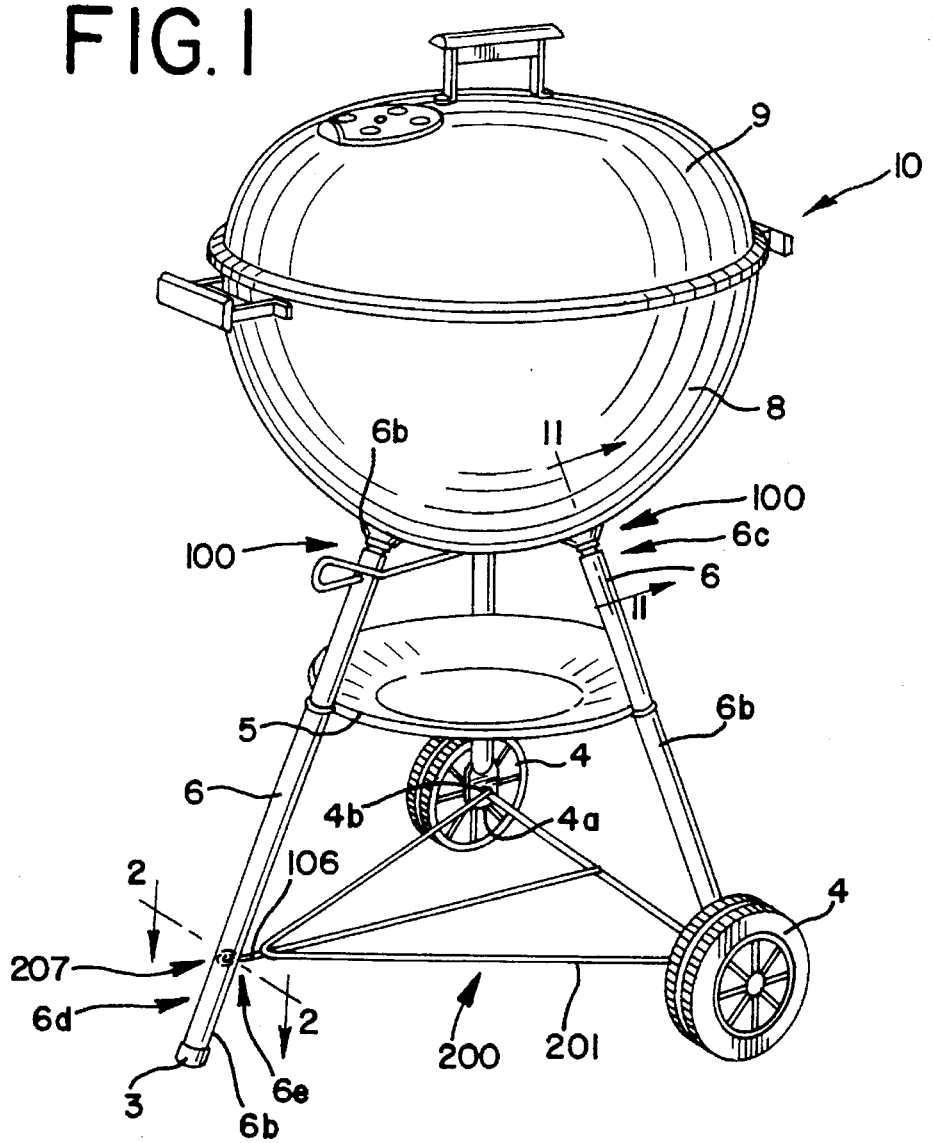
FIG. 1 is a perspective view of the charcoal grill having the leg mounting element and support assembly of the present invention incorporated therein.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIG. 1 is a perspective view of a barbecue grill, generally designated by the reference numeral 10, that is of a well-known configuration and has been sold by the Assignee of the present invention, Weber Stephen Products Co., for more than 35 years. The barbecue grill is generally constructed in accordance with the teachings of U.S. Pat. No. Re. 33,091, owned by the Assignee of the present invention. The grill is supported by a tripod leg arrangement of the type disclosed in U.S. Pat. No. 3,538,906, or by a cart, U.S. Pat. Nos. 5,027,788 and 5,076,252, all patents also owned by Weber-Stephen Products Co. and being incorporated herein by reference.

As shown in FIG. 1, the barbecue grill of the present invention includes a cover 9 and a cooking bowl 8. The grill is supported at a convenient height by three substantially identical, outwardly inclined, supporting legs 6. The cover 9 has vent openings in the bowl and cover which are opened and closed by a rotatable vent closure. A grate or fuel grid (not shown) is placed within the bowl and spaced a short distance above the bottom of the bowl to hold the solid fuel (such as charcoal briquettes), which are burned in the barbecuing procedure. Spaced above the grate and below the bowl's upper rim there is commonly a cooking grill or grid (not shown) on which to place the food to be cooked.

An ash catcher pan 5 is attached to the bowl 8 or the legs 6 below the bottom bowl. Thus, when ash falls from the kettle 10, it is caught by the ash pan 5. In the embodiment shown, wheels 4 are attached to two of the legs 6 and a pad 3 is secured to the third leg 6. A mounting element 100 secured to an upper end of each leg 6 cooperates with the bottom bowl 8 to interconnect the bottom bowl to the leg and a support member 200 secured adjacent the lower end of each leg cooperates with all the legs to interconnect the legs 6 together.

Figure 11:
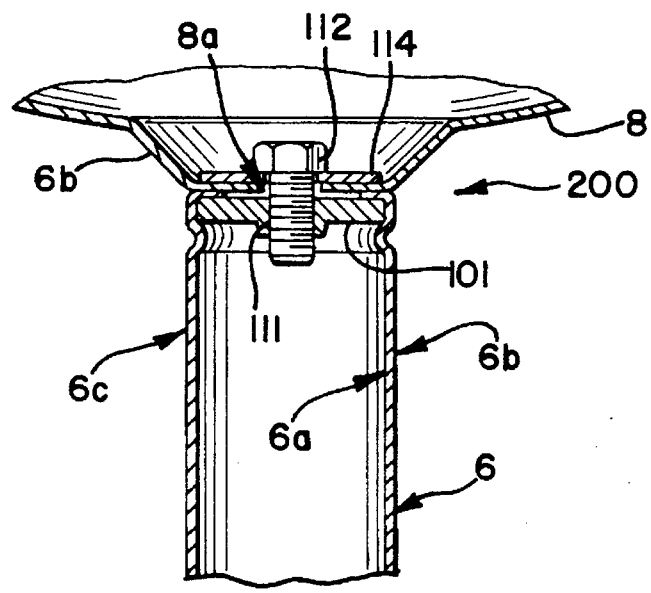
FIG. 11 is a sectional view of a support leg with the leg mounting element coupled therewith taken along line 11—11 in FIG. 1.
Figure 12:
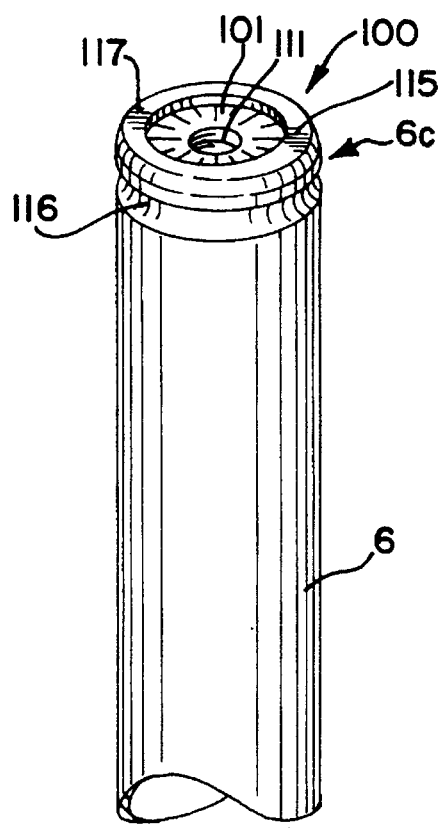
FIG. 12 is a perspective top view of the leg mounting element and a portion of the support leg of FIG. 1.
Figure 13:
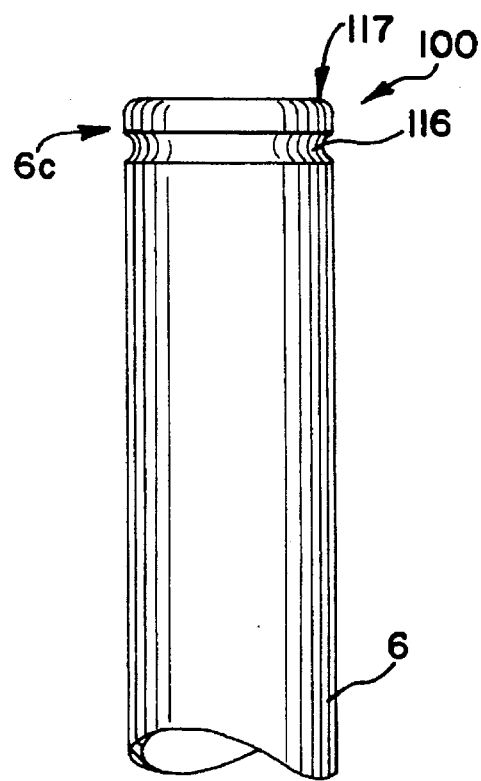
FIG. 13 is a side elevation view of the leg mounting element and a portion of the support leg of FIGS. 1 and 12.
Figure 14:
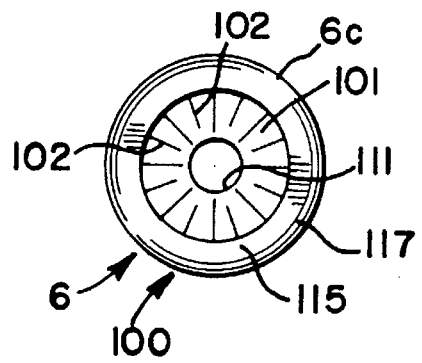
FIG. 14 is a top plan view of the leg mounting element and a portion of the support leg of FIGS. 1, 12 and 13.
Figure 15:
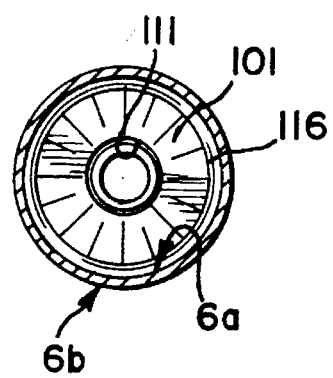
FIG. 15 is a bottom plan view of the leg mounting element and a portion of the support leg of FIGS. 1 and 12–14.

Turning to FIG. 11, each leg 6 is hollow and tubular with an interior surface 6a and an exterior surface 6b. The supporting legs are constructed of smooth-walled, lightweight and durable elongated tubes, including various aluminum alloys. The mounting element 100 is secured at the upper end 6c of each leg 6 and cooperates with the bottom bowl 8 of the grill 10 to interconnect the bottom bowl 8 to the leg 6. In particular, the mounting element 100 includes an insert 101 secured to the upper end 6c of the leg 6 and has a first fastener element 111 attached thereto or integral therewith. The bowl 8 has a second fastener element 112 attached thereto that cooperates with the first fastener element 111 to interconnect the bottom bowl 8 to the leg 6. As shown in the detail of FIG. 11, the leg 6 is tubular 6a, 6b and the insert 101 is a washer inserted and held in the upper end 6c of the leg so as to be perpendicular to the inner and outer walls 6a, 6b. This round washer or insert 101 is contoured like the inner surface 6a of the leg 6.

In addition, this insert, washer 101 has radial grooves 102 projecting inwardly from the outer edge. The grooves 102 are radially spaced apart. These grooves assist in preventing the insert 101 from rotating while it is in the leg 6.

Figure 16:
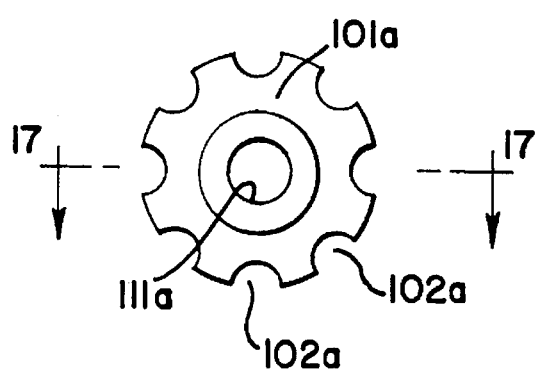
FIG. 16 is a top plan view of an alternate insert used in the mounting element.
Figure 17:
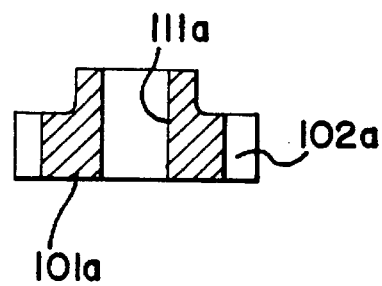
FIG. 17 is a sectional view of the insert of FIG. 16 along line 17—17 in FIG. 16.

In the alternative, the grooves can be notches. For example, as shown in FIGS. 16 and 17, the washer 101a has radial notches 102a projecting inwardly from the outer edge. The notches 102a are radially spaced apart and assist in preventing the insert 101a from rotating while it is in the leg 6.

The washer 101 includes an opening 111 with internal threading which act as the first fastener element. Similarly, the bowl 8 includes an aperture 8a therein. A threaded fastener 112 (the second fastening element) having a head and a threaded stud portion is passed through the aperture 8a in the bowl 8 and cooperates with the internal threads 111 of the washer 101. A conventional washer 114 is placed between the bowl 8 and the head of the threaded fastener 112, or bolt. The bolt 8 is tightened down and the leg 6 is secured to the bowl 8.

Figure 18:
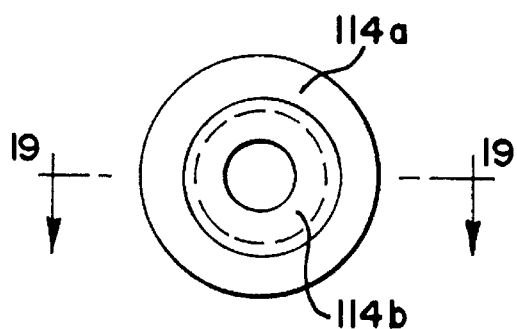
FIG. 18 is a top plan view of an alternate, cupped or embossed washer used to mount the mounting element to the grill; and, FIG. 19 is a sectional view of the washer of FIG. 18 along line 19—19 in FIG. 18.
Figure 19:
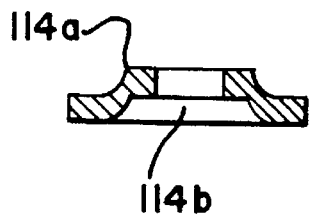

FIG. 11 shows a bolt 112 used as a fastener. The head of the bolt 112 can be undercut for improved gripping against the washer 114. In addition, FIGS. 18 and 19 show a second, preferred type of washer 114a that can be used in place of the washer 114 shown in FIG. 11. This alternate washer 114a is embossed or cupped, instead of being flat. As a result of being embossed or cupped, this washer 114a has an embossed or raised portion 114b on both sides adjacent the central opening. The embossing prevents the washer 111a from chipping the surface of the bowl when the fastener is tightened down. In addition, while a threaded bolt 112 is shown, it is appreciated that other fasteners may be used. For example, the washer may have a threaded stud projecting outwardly therefrom which passes through the aperture in the bowl. A wing nut can thus be used to cooperate with the stud and attach the leg to the bowl.

FIGS. 12–15 show the various views of the mounting element 100. The end 6c of the leg 6 holding the washer is folded inwardly forming a first flange 115 over a portion of the washer 101. This fold does not cover the opening 111 of the insert 101. In addition, just below the washer 101, an annular second flange 116 (or indentation) is formed in the leg 6. In constructing the mounting element 100, this second flange is first formed in the leg adjacent the end, the washer is inserted and seated on this flange, and the end is folded inwardly onto the washer forming the first flange. Consequently, the washer 101 is held in the leg 6 between the first flange 115 and the second flange 116.

In addition, the end 6c of each leg 6 holding the washer 101 and its outermost portion 117 (part of the first flange 115) is grinded or smoothed. The purpose of the grinding is for minimizing any marring or scratching of the bottom bowl 8 when the leg 6 (and cooperating fasteners 111,112) is tightened against the outer surface of the bowl.

As shown also in FIGS. 1 and 11, the bottom of the bowl 8 can include projecting seats 8b for the legs 6.

Turning back to FIG. 1, a support member 200 is also shown interconnecting the legs 6. This support member 200 is attached adjacent a lower end 6d of each leg 6 and is adapted for engaging all of the legs and at least one internal surface 6a of one leg 6.

This support member 200 is a frame having a plurality of interconnected rods 201. The frame doubles as a storage rack for loose items such as a charcoal bag and utensils. For example, as shown in FIG. 3, a first embodiment has a single bent, or V-shaped, rod 202, one longitudinal rod 203 and a transverse rod 204. A second embodiment has three (3) bent, or V-shaped, rods 202, one longitudinal rod 203 and a single transverse rod 204. The rods 201 are welded together at their points of intersection. The transverse rod 104 extends beyond the points of intersection with the V-shaped rods 202 forming two extensions 105. A third extension 106 is formed by the portion of the longitudinal rod 203 that projects beyond the point of intersection with the V-shaped rods 202. Each of the two extensions 105 of the transverse rod 204 are passed through a hole (not shown) formed in the wall of lower portion 6d of two legs 6 and a hole (not shown) in a wheel 4. The holes in the legs and the wheels pass entirely through the leg and the wheel. A simple fastener, such as a pin or an axially mounted, radial gripping hubcap attaches to the end of the portion of the extension 205 projecting out from the wheel 4 to secure the support member 200, to the leg 6 and wheel 4. In place of a hole in the legs 6, a bracket 4a can be formed or attached to the bottom of the legs for the wheels. This bracket 4a similarly has a hole for receiving an extension 205 of the transverse rod 204. Two wheels 4 are thus attached to the legs 6 and the support structure 200, as shown in FIG. 1.

In assembling the grill 10, attaching the legs 6 for the wheels and the support structure 200 is done first. Specifically, the two legs for the wheels are attached with the aid of the mounting elements 100 to the bottom bowl 8 of the grill. The extensions 205 formed at the ends of the transverse rod 204 are passed through the holes 4b formed through the legs or bracket 4a and the central holes in the wheels 4 and secured. The extension 206 formed at one end, the end opposite the one connected to the transverse rod 204 of the longitudinal rod 203 is then secured to the third leg 6 with the pad 3 thereon. This third leg 6 is next attached to the bowl 8 by securing a mounting element 100 in the leg to the bowl.

Figure 2:
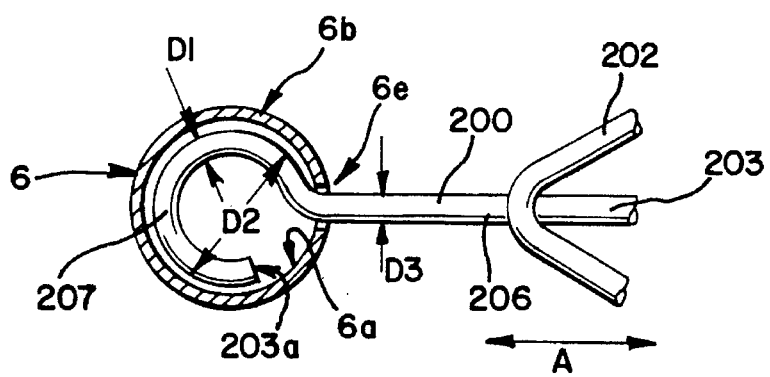
FIG. 2 is a sectional view of a support leg with the support assembly coupled therewith taken along line 2—2 in FIG. 1.

As to the third leg 6 and the extension 106 formed by the longitudinal rod 203, it engages the internal surface 6a of the one leg 6 and completes the interlocking of the legs and the support structure, all without an external or additional fastener. This last extension 206 includes a hook 207 formed by bending the rod 203 at its very end 203a (see FIG. 2). This hook 207 is coplanar with the frame, or V-shaped rods 202, and transverse rod 204. Additionally, the hook 207 has two diameters of importance. The first diameter D1 is the cross-section diameter of the hook 207, that being the same diameter D3 of the longitudinal rod 206. (FIG. 2). In addition, the arcuate bend in the hook 207 itself has a hook diameter D2. (FIG. 2). The leg 6 with the pad 3 and without a wheel 4 has an opening 6e adjacent the lower end 6d thereof. The diameter of this opening 6e is greater than the cross-sectional diameter D1 of the hook 207 and less than the hook diameter D2. This permits one to place the distal end 203a of the hook 207 into the opening 6e. Next, the leg 6 is manipulated while the hook 207 is fed into the opening 6e.

At a point, the hook 207 can no longer be fed into the opening 6e. The leg 6 is, at this point, securely attached as shown in FIG. 2. By pulling, or even pushing, the leg 6 (Arrow A in FIG. 2), the hook 207, now inside the leg, acts as a stop. Specifically, the distal end 203a and arcuate portion of the hook, neither being collinear with the opening in the leg, contacts the inner surface 6a of the leg. To successfully remove the hook and support member from the leg, one must manipulate the leg and slowly remove the hook. As noted above, the upper portion of this last leg is next connected to the bowl of the grill.

In practice, the V-shaped rods 202 have a rod diameter 0.162 inches and are 8 gauge. The apex of the V is about 60 degrees. The V-shape is 15.75 inches in height and has a base width of 18.50 inches. The transverse rod 204 has a rod diameter of 0.375 inches and is 22.5 inches in length. Consequently, the extensions 205 are each approximately 2 inches. The longitudinal rod 203 has a rod diameter of 0.162 inches. The extension 206 between the apex of the V-shaped rods 202 and the initial bend in the hook 207 is approximately 0.75 inches. The hook diameter is 0.530 inches.

Once all the legs are attached to the bowl, all the legs are interlocked by the support structure 200. As a result, it is extremely difficult to separate the legs from each other and the bowl of the grill. Once the grill unit is assembled, including the insertion and locking of the hook, the tripod configuration of the supporting legs is set in a very sturdy manner. If someone inadvertently nudges the grill body or the legs, the legs will not become dismounted or disengaged from the grill.

While the specific embodiments have been illustrated and described, numerous modifications come to mind without significantly departing from the spirit of the invention and the scope of protection is only limited by the scope of the accompanying claims.

We claim:

1. A barbecue grill assembly having a bottom bowl for cooking with a plurality of supporting legs maintaining the bowl above the ground, the supporting legs further having an exterior surface and an interior surface and comprising:

a mounting element at an upper end of each leg cooperating with the bottom bowl to interconnect the bottom bowl to the leg; and, a support member interconnecting the legs and attached adjacent a lower end of each leg and further adapted for engaging at least one internal surface of one leg, the support member including a hook having a cross-sectional diameter, a hook diameter, and a distal end and the one leg includes an opening therein, the opening having a diameter greater than the cross-sectional diameter and less than the hook diameter, the hook being adapted for first threading into the opening then by manipulation of the one leg being fed into the one leg such that when the one leg is attached to the bowl, the distal end of the hook contacts the inner surface of the one leg.

2. A grill assembly having a bottom bowl for cooking with a plurality of tubular supporting legs maintaining the bowl above the ground, the tubular supporting legs further having an exterior surface and an interior surface and comprising:

an insert secured to an upper end of the leg having a first fastener element attached thereto, the bowl having a second, cooperating fastener element attached thereto to interconnect the bottom bowl to the leg; and, a support member interconnecting the legs and attached adjacent a lower end of each leg and adapted for engaging at least one leg and including a wire hook having a cross-sectional diameter, a hook diameter, and a distal end and the one leg including an opening therein, the opening having a diameter greater than the cross-sectional diameter and less than the hook diameter, the hook being adapted for first threading into the opening then by manipulation of the one leg being fed into the one leg such that when the one leg is attached to the bowl, the distal end of the hook contacts the inner surface of the one leg.

3. The grill assembly of claim 2 wherein the insert is a washer inserted into the upper end of the leg and held therein, the washer having an opening with internal threading and the bowl having an aperture therein, a threaded fastener passing through the aperture in the bowl and cooperating with the internal threads of the washer and the end of the leg holding the washer is folded inwardly forming a first flange over a portion of the washer and a second flange is formed in the leg under the washer, the washer being held between the first and second flanges.

4. A support member for a barbecue grill assembly, the assembly having a bottom bowl for cooking with a plurality of supporting legs maintaining the bowl above the ground, the supporting legs further having an exterior surface and an interior surface, comprising:

means for interconnecting the legs and attached adjacent a lower end of each leg and further adapted for engaging at least one internal surface of one leg and including a wire hook having a cross-sectional diameter, a hook diameter, and a distal end and the one leg includes an opening therein, the opening having a diameter greater than the cross-sectional diameter and less than the hook diameter, the hook being adapted for first threading into the opening then by manipulation of the leg being fed into the one leg such that when the one leg is attached to the bowl, the distal end of the hook contacts the inner surface of the one leg.

5. The support member of claim 4 wherein the support member is a frame having a plurality of extensions, at least one extension connected to both a leg and a wheel and at least one extension engaging the one internal surface of one leg without a fastener.

6. A support member for a barbecue grill assembly, the assembly having a bottom bowl for cooking with a plurality of supporting legs maintaining the bowl above the ground, the supporting legs further having an exterior surface and an interior surface, comprising:

means for interconnecting the legs and attached adjacent a lower end of each leg and further adapted for engaging at least one internal surface of one leg and including a frame having a plurality of extensions, at least one extension connected to both a leg and a wheel and at least one extension engaging the one internal surface of one leg without a fastener, the one extension engaging the one internal surface of the one leg is a wire hook having a cross-sectional diameter, a hook diameter, and a distal end and at least one leg includes an opening therein, the opening having a diameter greater than the cross-sectional diameter and less than the hook diameter, the hook being adapted for first threading into the opening then by manipulation of the one leg being fed into the one leg such that when the one leg is attached to the bowl, the distal end of the hook contacts the inner surface of the one leg.

* * * * *